(12) United States Patent
Daandels et al.

(10) Patent No.: US 11,780,558 B2
(45) Date of Patent: Oct. 10, 2023

(54) SUPPORT STAY AND SUPPORT ARRANGEMENT FOR SUPPORTING A MOVABLE PART OF AN AIRCRAFT

(71) Applicant: Airbus Operations GmbH, Hamburg (DE)

(72) Inventors: Dort Daandels, Hamburg (DE); Markus Gibbert, Hamburg (DE); Blazenko Coskovic, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 106 days.

(21) Appl. No.: 17/185,423

(22) Filed: Feb. 25, 2021

(65) Prior Publication Data
US 2021/0269142 A1 Sep. 2, 2021

(30) Foreign Application Priority Data

Feb. 28, 2020 (DE) .......................... 102020105387.8

(51) Int. Cl.
*B64C 9/02* (2006.01)
*B64C 3/50* (2006.01)

(52) U.S. Cl.
CPC . *B64C 9/02* (2013.01); *B64C 3/50* (2013.01)

(58) Field of Classification Search
CPC ................ B64C 3/50; B64C 9/02; B64C 5/08
See application file for complete search history.

(56) References Cited

U.S. PATENT DOCUMENTS

| 10,737,763 | B2 | 8/2020 | Schlipf et al. | |
| 2016/0167768 | A1* | 6/2016 | Knight | B64C 9/02 244/99.2 |
| 2017/0036751 | A1* | 2/2017 | Topf | B64C 30/00 |
| 2018/0100790 | A1 | 4/2018 | Schleuter et al. | |
| 2018/0141637 | A1* | 5/2018 | Schlipf | B64C 9/22 |
| 2018/0186443 | A1* | 7/2018 | Belik | B64D 45/00 |
| 2020/0023939 | A1* | 1/2020 | Schlipf | B64C 9/14 |
| 2020/0307769 | A1* | 10/2020 | Lorenz | B64C 9/02 |
| 2021/0078731 | A1* | 3/2021 | Fauchery | B64F 5/10 |

FOREIGN PATENT DOCUMENTS

| EP | 3299278 A1 | 3/2018 |
| EP | 3584155 A1 | 12/2019 |

OTHER PUBLICATIONS

German Search Report; priority document, dated Nov. 18, 2020.

* cited by examiner

*Primary Examiner* — Rodney A Bonnette
(74) *Attorney, Agent, or Firm* — Greer, Burns & Crain, Ltd.

(57) ABSTRACT

A support stay is provided to improve failsafe configurations for movable parts of an aircraft. The support stay supports the movable part with a primary body and a separate secondary body. The primary body and the secondary body provide separate load paths. The secondary body is attached to the primary body by a mechanical connection, e.g., rivets. If one of the bodies becomes structurally compromised, for example by a crack, this configuration does not transfer shear load between the primary and secondary body, so that the other body does not become structurally compromised.

20 Claims, 4 Drawing Sheets

SUPPORT STAY AND SUPPORT ARRANGEMENT FOR SUPPORTING A MOVABLE PART OF AN AIRCRAFT

CROSS-REFERENCES TO RELATED APPLICATIONS

This application claims the benefit of the German patent application No. 102020105387.8 filed on Feb. 28, 2020, the entire disclosures of which are incorporated herein by way of reference.

FIELD OF THE INVENTION

The invention relates to support stay configured for supporting a movable part of an aircraft. Furthermore, the invention relates to a support arrangement configured for supporting a movable high-lift device and/or movable control surface, and such a device and surface.

BACKGROUND OF THE INVENTION

In the design of aircraft, different measures are used to design a failsafe system. Regarding control surfaces or high-lift devices, the airfoil may bind when moving or exceed an allowed movement space due to severe vibration. For these and like conditions, the system may include several struts or stays that prevent binding or too much movement. Due to load spiking, however, a strut or stay may get structurally compromised. The remaining struts and stays then take over the function and distribute the load among them. Thus, the system is failsafe.

Such configurations are effective albeit cumbersome. In particular, modern space requirements in wings may not allow for several distinct struts or stays. Consequently, there is a need to provide a failsafe system with less effort, fewer parts and costs.

SUMMARY OF THE INVENTION

It is an object of the invention to improve failsafe configurations for movable parts of aircraft.

The invention provides a support stay configured to support a movable part of an aircraft, the support stay having a primary body providing a primary load path and a separate secondary body providing a, preferably separate, secondary load path, wherein the secondary body is attached to the primary body by a mechanical connection, wherein the mechanical connection is configured such that forces causing a structural compromization of the primary body are prevented from being transferred to the secondary body in a manner that prevents the secondary body from becoming structurally compromised, and vice-versa.

Preferably, the primary body and the secondary body include facing contact surfaces that are able to slide relative to each other, when the primary body and/or the secondary body is deformed due to a force transferred by the primary load path and/or secondary load path.

Preferably, the mechanical connection is configured to prevent disengagement of the primary body from the secondary body.

Preferably, the mechanical connection is configured to press the primary body against the secondary body.

Preferably, the primary body and the secondary body each have at least one fastener opening. Preferably, the mechanical connection includes at least one mechanical fastener passing through the fastener opening.

Preferably, the mechanical fastener is configured to prevent disengagement of the primary body from the secondary body along a longitudinal direction of the mechanical fastener.

Preferably, the mechanical fastener is configured to press the primary body against the secondary body along a longitudinal direction of the mechanical fastener.

Preferably, the support stay further comprises a first mounting portion configured to be mounted to the movable part and a second mounting portion configured to be mounted to a structural part of the aircraft. Preferably, the first mounting portion and the second mounting portion are spaced apart by means of the primary load path and the secondary load path, so as to transfer forces between the first and second mounting portions.

Preferably, the movable part is chosen from a group consisting of high-lift devices, such as flaps and slats, control surfaces, such as elevators, rudders, ailerons, and combinations thereof, such as elevons and flaperons.

Preferably, the primary body and the secondary body are made of light metals, such as aluminum or titanium, or light metal alloys, such as aluminum alloys and titanium alloys.

Preferably, the primary body and the secondary body are made of different materials.

Preferably, the primary body includes a plurality of side portions that are integrally formed with at least one intermediate portion that spaces apart the side portions. Preferably, the secondary body is attached to the side portions.

Preferably, the secondary body is configured for cladding the primary body along any of its side portions. Preferably, the secondary body is shaped so as to fully cover the side portion.

The invention provides a support arrangement configured to support a movable high-lift device and/or movable control surface, the support arrangement comprising a primary support, a secondary support, and a preferred support stay, wherein the support stay is arranged such that a spanwise movement of the primary support is prevented.

The invention provides a high-lift device and/or control surface for an aircraft comprising a movable airfoil supported by a preferred support stay and/or supported by a preferred support arrangement.

The invention provides an aircraft including a preferred support stay and/or a preferred support arrangement and/or a preferred high-lift device and/or a preferred control surface.

Typical flap to wing connections may use an underslung beam with a forward attachment of two bolts in two lugs loaded under bending. On a rear attachment tension and shear bolts in conjunction with pressure paths are used. It is also possible to have a design using a rib that is bolted with many bolts to the rear spar or lower cover. A track for extending and retracting the flap/flaperon may be attached to the wing. Usually multiple struts/stays/rods are installed so that if any one becomes structurally compromised, the remaining parts take over the load.

With the invention, the movable parts may be installed more quickly to the wing. The transfer of side loads is preferably taken by a strut rather than via shear loads in bolts. Also it is possible to have multiple load paths with minimal space allocation.

These measures allow a high rate of equipping wings with flaps, thereby reducing cost and lead time. Furthermore, the number of parts may be reduced. A modular installation is enabled due to reduction of the amount of connections between wingbox and flaperon or airfoil. As a result, complexity is reduced. In addition, less space allocation in a confined space is necessary.

As an example, the flaperon is attached to the wing by support ribs and kinematic parts. The support rib connected to the rear wing spar has two radially loaded bolts. One is close to the top flange and the other is close to the bottom flange. This design can take the loads in approximately flight direction and in Z-direction (vertical). However, loads in span direction and the moment around the z-axis are not taken by this connection.

These loads and moments are supported by a side strut or support stay. A single conventional support stay is not considered failsafe. Usually a second strut would be added, which is difficult due to space restrictions.

Thus, a support stay according to the invention having multiple load paths integrated into a single part is used. With this idea, the damage tolerance concept of a failsafe system is fulfilled. It is also beneficial that during the installation of the flaperon to the wing only one strut needs to be assembled. Thus, further reducing equipment time.

BRIEF DESCRIPTION OF THE DRAWINGS

Embodiments are described with reference to the accompanying schematic drawings.

DETAILED DESCRIPTION OF THE PREFERRED EMBODIMENTS

Figure 1:
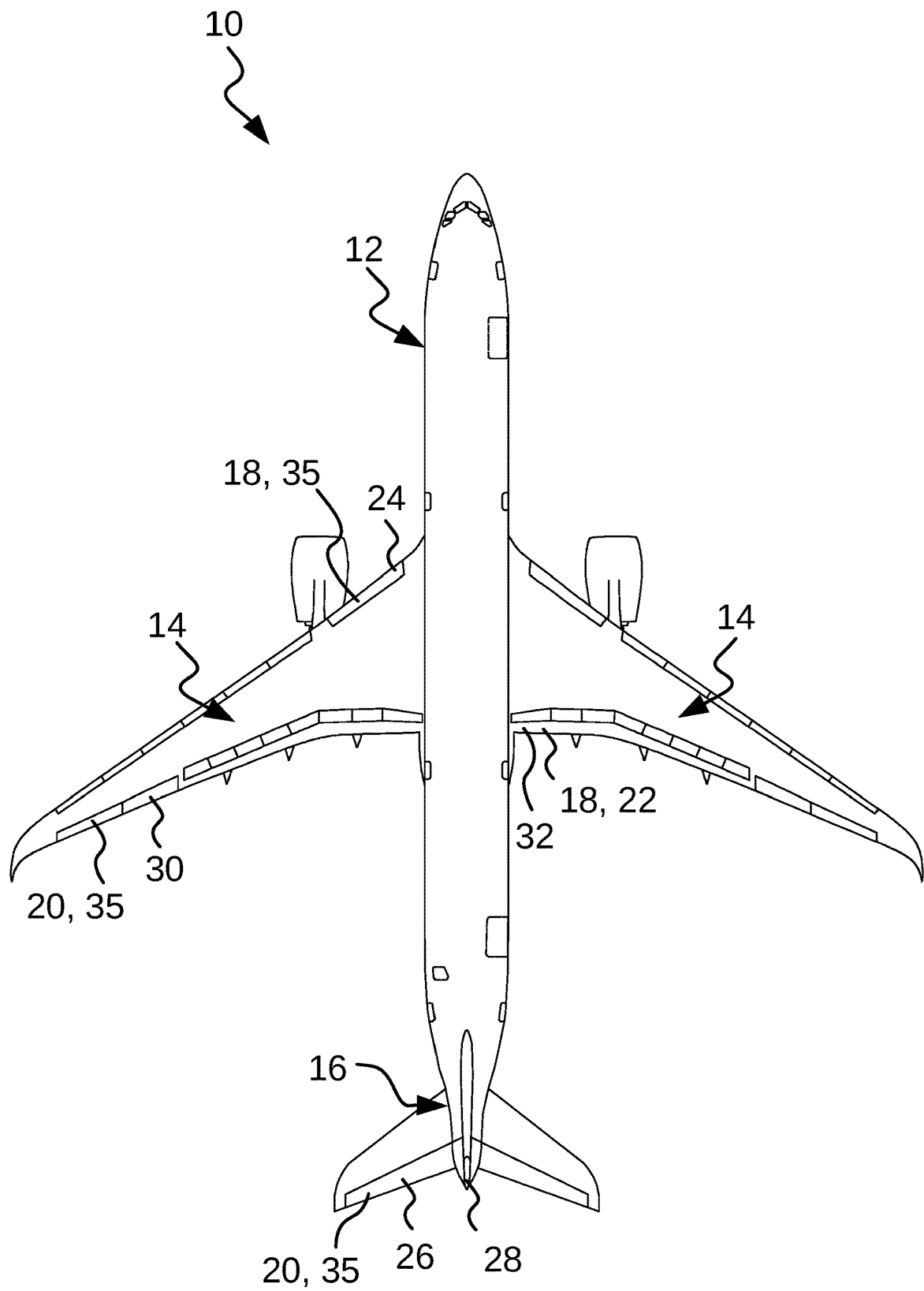
FIG. 1 depicts an embodiment of an aircraft.

FIG. 1 depicts an aircraft 10 according to the invention. The aircraft 10, in a manner known per se, comprises a fuselage 12 and a pair of wings 14 attached thereto. The aircraft 10 also includes a tail plane section 16.

The aircraft 10 has at least one high-lift device 18 and at least one control surface 20. The high-lift device 18 may be any of a flap 22 or a slat 24. The control surface 20 may be any of an elevator 26, a rudder 28, and an aileron 30. Furthermore, a combination of the high-lift device 18 and the control surface 20 is possible, like a flaperon 32. The flaperon 32 is attached to the wing 14 at its root, for example, using a support arrangement 34. All these high-lift devices 18 and control surfaces 20 and their hybrids are an example for a movable part 35 of the aircraft 10.

Figure 2:
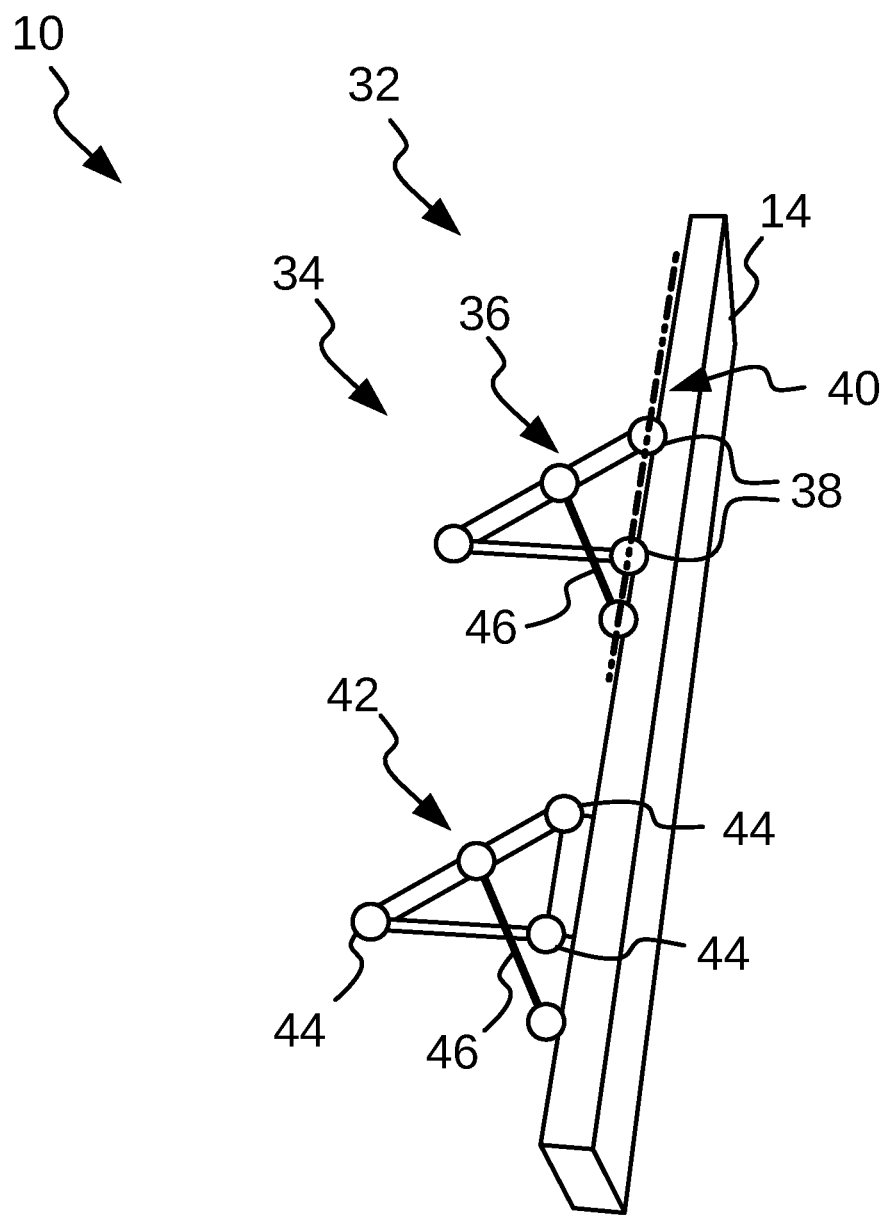
FIG. 2 depicts an embodiment of a support arrangement.

As depicted in FIG. 2, the support arrangement 34 includes a primary support 36. The primary support 36 is attached to the wing 14 using spherical bearings 38. Thus, the primary support 36 has a primary pivot axis 40 about which the primary support 36 may pivot. The flaperon 32 is attached to the primary support 36 in parallel to the wing 14 (not depicted).

The support arrangement 34 includes a secondary support 42. The secondary support 42 is attached to the wing 14 using spherical bearings 44. The secondary support 42 is attached in a manner that allows a spanwise movement of the secondary support 42 relative to the primary support 36.

The support arrangement 34 includes at least one support stay 46. The support stay 46 is attached to the primary support 36 in a manner that prevents the primary support 36 from pivoting about the pivot axis 40.

Alternatively or additionally, the support stay 46 may be attached to the secondary support 42 in order to prevent the secondary support 42 from pivoting.

Figure 3:
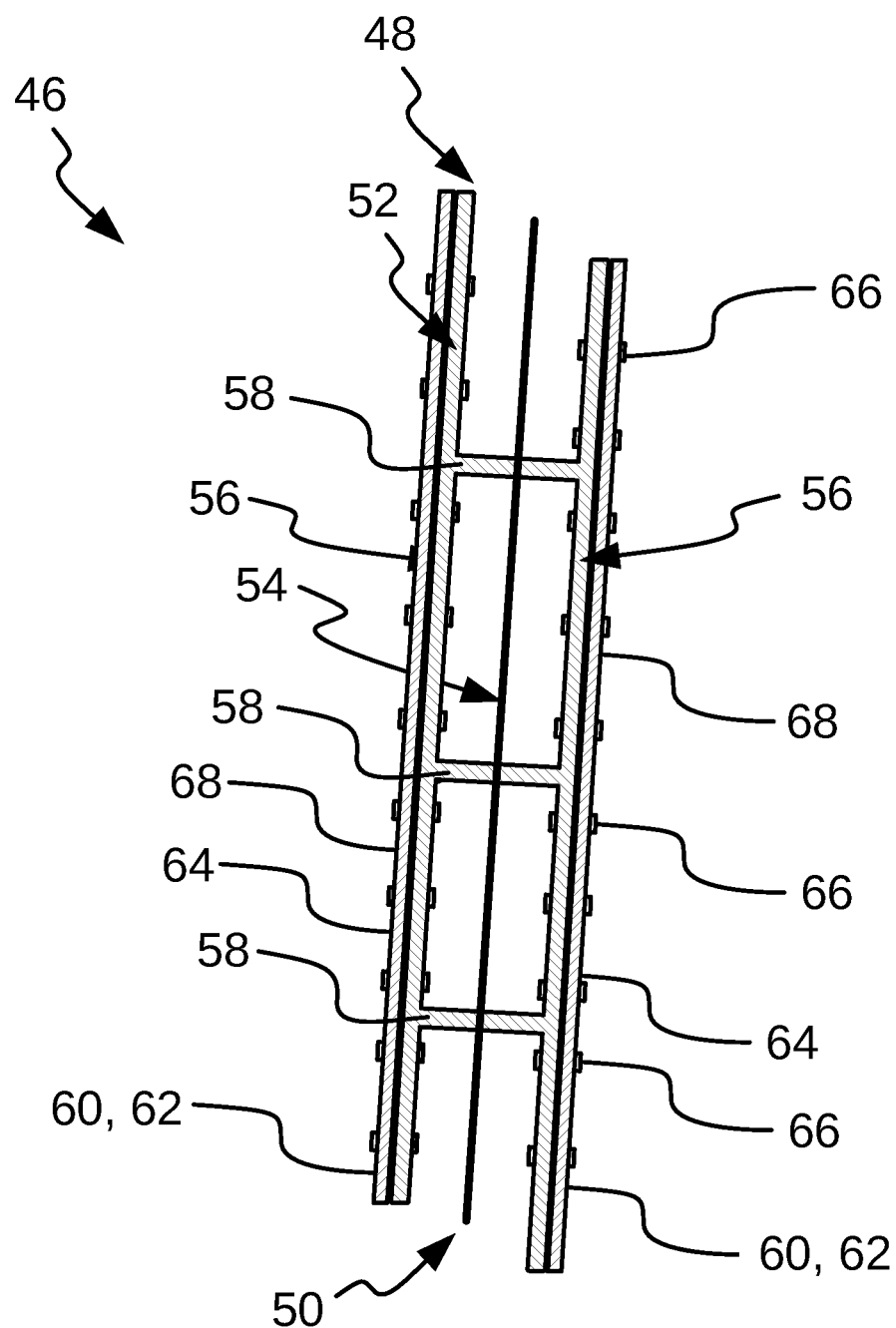
FIG. 3 depicts another embodiment of a support stay.

Referring to FIG. 3, the support stay 46 is depicted in more detail. The support stay 46 includes a first mounting portion 48 that is attachable to the primary support 36. The support stay 46 includes a second mounting portion 50 that is attachable to the wing 14. The first and second mounting portion 48, 50 may be configured for cylindrical or spherical bearings.

The support stay 46 comprises a primary body 52. The primary body 52 is integrally formed as a single unitary member. The primary body 52 provides a primary load path 54 that allows transferring of loads between the first and second mounting portions 48, 50. The primary body 52 is made of aluminum, for example. The primary body 52 has a plurality of side portions 56. The side portions 56 are spaced apart by an intermediate portion 58 of the primary body 52. The side portions 56 can be offset in the longitudinal direction in order to allow installation under an angle.

The support stay 46 comprises a plurality of secondary bodies 60. Each secondary body 60 is integrally formed as a single unitary member. Each secondary body 60 is formed as a flat piece. The secondary bodies 60 provide a secondary load path 62 that allows transferring of loads between the first and second mounting portions 48, 50. The secondary body 60 is made of titanium, for example. Each secondary body 60 is attached the primary body 52 by means of a mechanical connection 64, preferably to the side portions 56. The secondary body 60 thus may act as a cladding.

The mechanical connection 64 includes a plurality of mechanical fasteners 66, such as rivets. It should be noted that while the fasteners 66 are depicted as protruding from the support stay 46 for better illustration, the fasteners 66 may also be flush with the surface of the support stay 46 or recessed in that surface. It should further be noted that the number of fasteners 66 depicted is merely exemplary.

The mechanical connection 64 prevents disengagement of the secondary bodies 60 from the primary body 52. The mechanical connection 64 presses the secondary bodies 60 and the primary body 52 against each other. The mechanical connection 64 thus generates a plurality of point like connections. Where no mechanical fastener 66 is present, the primary body 52 and the secondary body 60 engage with facing contact surfaces 68.

In normal operation, the primary body 52 carries the bulk of the load between the first and second mounting portions 48, 50. In addition, the secondary bodies 60—sometimes using small but very robust portions of the primary body 52—carry less load.

If the primary body 52 gets structurally compromised, for example by a crack, the crack may only propagate to the contact surfaces 68 between the primary body 52 and the secondary bodies 60. The contact surfaces 68 are able to slide relative to each other and hence not able to transmit the shear forces necessary for the crack to continue. The mechanical fasteners 66 may be elastically deformed during this. It may be possible that some mechanical fasteners 66 also get structurally compromised. However, the support stay 46 as a whole retains its function of transmitting force, thereby being failsafe. Thus, the load path is switched from the primary load path 54 to the secondary load path 62. It should be noted that the opposite is also possible, i.e., the secondary load path 62 gets compromised and the primary load path 54 takes over.

Subsequent embodiments are described only insofar as they differ from the previously described embodiment.

Figure 4:
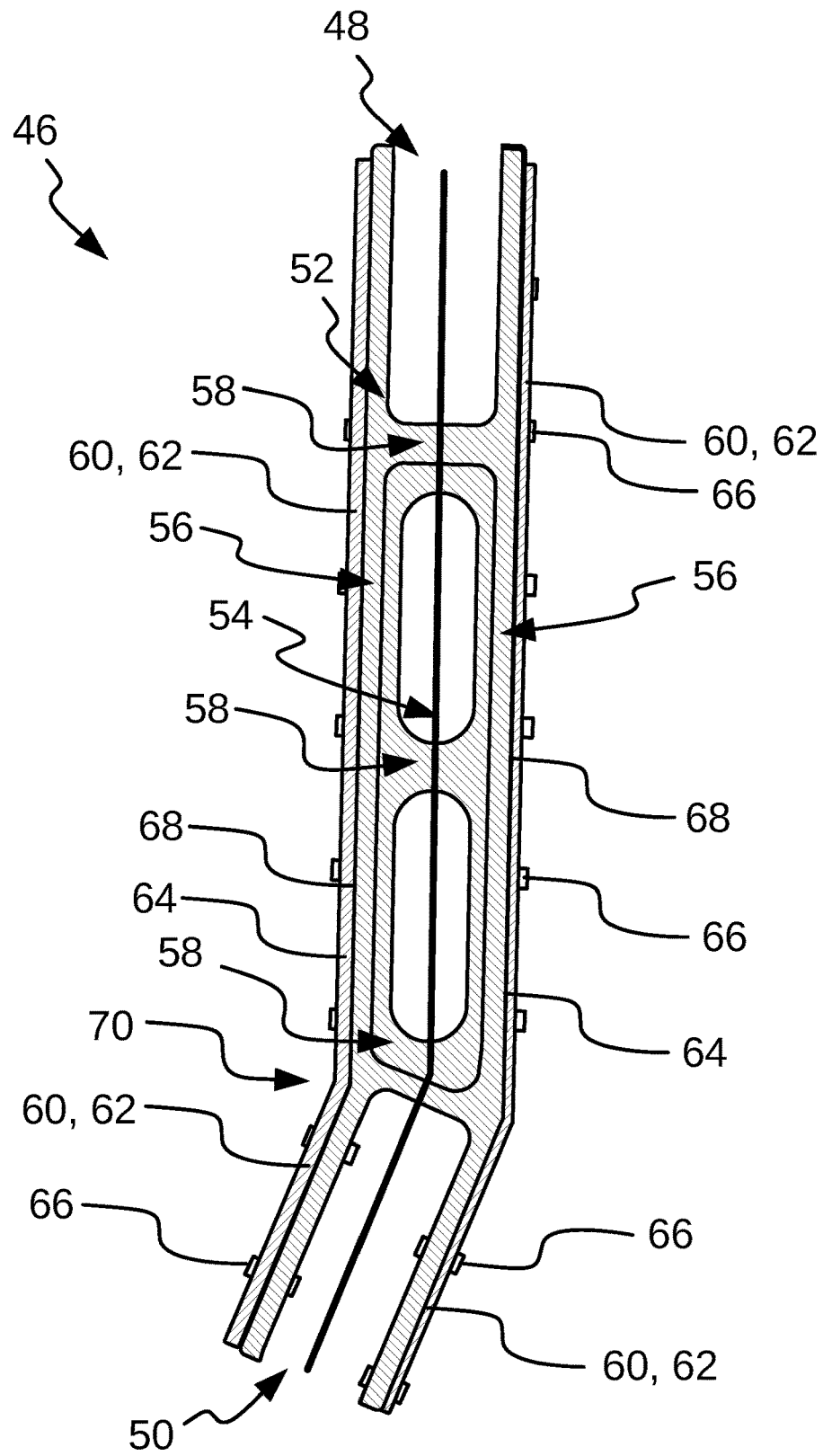
FIG. 4 depicts a variant of the support stay of FIG. 3.

Referring to FIG. 4, an angle between the first and second mounting portions 48, 50 is achieved using a kink portion 70.

It should be noted that it is not necessary that the primary and secondary bodies 52, 60 are made of different materials. They may be made from the same material.

In order to improve failsafe configurations for movable parts (35) of aircraft (10) a support stay (46) is provided. The support stay (46) supports the movable part (35) with a primary body (52) and a separate secondary body (60). The primary body (52) and the secondary body (60) providing separate load paths (54, 62). The secondary body (60) attached to the primary body (52) by a mechanical connection (64), e.g., rivets. If one of the bodies (52, 60) becomes structurally compromised, for example by a crack, this configuration does not transfer shear load between the primary and secondary body (52, 60) so that the other body does not become structurally compromised.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS 10 aircraft
12 fuselage
14 wing
16 tail plane section
18 high-lift device
20 control surface
22 flap
24 slat
26 elevator
28 rudder
30 aileron
32 flaperon
34 support arrangement
35 movable part
36 primary support
38 spherical bearings
40 primary pivot axis
42 secondary support
44 spherical bearings
46 support stay (support strut)
48 first mounting portion
50 second mounting portion
52 primary body
54 primary load path
56 side portion
58 intermediate portion
60 secondary body
62 secondary load path
64 mechanical connection
66 mechanical fastener
68 contact surface
70 kink portion

The invention claimed is:

1. A support stay configured to support a movable part of an aircraft, the support stay comprising:

a primary body providing a primary load path, a first secondary body providing a first secondary load path, and, a second secondary body providing a second secondary load path, wherein the primary body and the first and second secondary bodies are each formed as single unitary members, wherein the first and second secondary bodies are attached to the primary body by a mechanical connection, wherein the mechanical connection is configured such that forces causing a structural compromization of the primary body are prevented from being transferred to the first or second secondary bodies in a manner that prevents the first or second secondary bodies from becoming structurally compromised, and vice-versa, wherein the mechanical connection comprises a plurality of first mechanical fasteners, with each first mechanical fastener passing through both the primary body and the first secondary body and not the second secondary body, and, a plurality of second mechanical fasteners, with each second mechanical fastener passing through both the primary body and the second secondary body and not the first secondary body.

2. The support stay according to claim 1, wherein the primary body and the first and second secondary bodies include facing contact surfaces that are slidable, relative to each other, when at least one of the primary body, the first second body, or the second secondary body is deformed due to a force transferred by at least one of the primary load path or the secondary load path.

3. The support stay according to claim 1, wherein the mechanical connection is configured to prevent disengagement of the primary body from the secondary body.

4. The support stay according to claim 1, wherein the mechanical connection is configured to press the primary body against the secondary body.

5. The support stay according to claim 1, wherein the first and second mechanical fasteners are configured to prevent disengagement of the primary body from the respective first and second secondary bodies along a longitudinal direction of the respective mechanical fastener.

6. The support stay according to claim 1, wherein the first and second mechanical fasteners are configured to press the primary body against the respective first and second secondary bodies along a longitudinal direction of the respective mechanical fastener.

7. The support stay according to claim 1, further comprising a first mounting portion, configured to be mounted to the movable part, and a second mounting portion configured to be mounted to a structural part of the aircraft, wherein the first mounting portion and the second mounting portion are spaced apart by means of the primary load path and the secondary load path, so as to transfer forces between the first and second mounting portions.

8. The support stay according to claim 1, wherein the movable part is chosen from a group consisting of high-lift devices, control surfaces, and combinations of high-lift devices and control surfaces.

9. The support stay according to claim 8, wherein the high-lift devices comprise flaps and slats.

10. The support stay according to claim 8, wherein the control surfaces comprise elevators, rudders, ailerons, and combinations thereof.

11. The support stay according to claim 8, wherein the combinations of high lift devices and control surfaces comprise elevons and flaperons.

12. The support stay according to claim 1, wherein the primary body and the first and second secondary bodies are made of light metals or light metal alloys.

13. The support stay according to claim 12, wherein the light metals comprise aluminum or titanium and the light metal alloys comprise aluminum alloys and titanium alloys.

14. The support stay according to claim 1, wherein the primary body and the first and second secondary bodies are made of different materials.

15. The support stay according to claim 1,
wherein the primary body includes a plurality of side portions that are integrally formed with at least one intermediate portion that sets a distance between the side portions, and
wherein the first and second secondary bodies are attached to the side portions.

16. The support stay according to claim 1, wherein the first and second secondary bodies are each configured to clad the primary body along any side portion of the primary body.

17. A support arrangement configured to support at least one of a movable high-lift device or a movable control surface, the support arrangement comprising:
a primary support,
a secondary support,
a spherical bearing connecting the primary support, the secondary support, or both to the movable high-lift device or the movable control surface, and
a support stay according to claim 1,
wherein the support stay is arranged such that at least one of a pivotal or spanwise movement of the primary support is prevented.

18. At least one of a high-lift device or a control surface for an aircraft comprising a movable airfoil supported by a support stay according to claim 1.

19. An aircraft including a support stay according to claim 1.

20. A support stay configured to support a movable part of an aircraft, the support stay comprising:
a primary body providing a primary load path, and
a secondary body providing secondary load path,
wherein the primary body and the secondary body are each formed as single unitary members,
wherein the secondary body is attached to the primary body by a mechanical connection,
wherein the mechanical connection is configured such that forces causing a structural compromization of the primary body are prevented from being transferred to the secondary body in a manner that prevents the secondary body from becoming structurally compromised, and vice-versa,
wherein the mechanical connection comprises a plurality of mechanical fasteners, with each mechanical fastener passing through both the primary body and the secondary body,
wherein the primary body includes a plurality of side portions that are integrally formed with at least one intermediate portion that sets a distance between the side portions, and
wherein the secondary body is attached to the side portions.

* * * * *